3,377,246
ANTIDEPRESSANT COMPOSITIONS AND METH-
ODS EMPLOYING 7-N AZAINDOLES
Bernard Loev, Broomall, and Edward Macko, Philadelphia, Pa., assignors to Smith Kline & French Laboratories, Philadelphia, Pa., a corporation of Pennsylvania
No Drawing. Filed Sept. 20, 1966, Ser. No. 580,589
10 Claims. (Cl. 167—65)

ABSTRACT OF THE DISCLOSURE

Pharmaceutical compositions having antidepressant activity containing as active ingredients N-lower alkyl azaindoles. Also methods of inducing antidepressant activity using these compounds with details of the pharmacological study of the parent compound 7-methyl-7-azaindole.

---

This invention comprises pharmaceutical compositions containing various N-alkylazaindoles which have antidepressant activity. Furthermore there is described herein methods of using these N-alkylazaindole compositions to induce antidepressant activity in an animal host or to prevent depression in such a host.

The compositions of this invention are dosage unit forms such as a capsule, a tablet, oral or sterile parenteral suspension, sterile parenteral solution, troche or a sustained release capsule or tablet containing a therapeutically effective amount of a N-alkylazaindole having, for example, the fololwing basic formula:

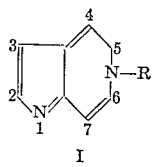

I in which R is lower alkyl of from 1–3 carbon atoms or allyl. The floating aza or nitrogen atom in the pyridyl ring may be at any of the 4–7 positions with appropriate shifts of the conjugated bonds but is preferably at the 7-position. The N-alkylazaindoles of Formula I may be more precisely named as X-alkyl-XH-pyrrolopyridines in which X is 4–7. Also included and even preferred are the nontoxic acid addition salts of these bases with standard pharmaceutically acceptable acids.

Azaindoles are known to possess depressant properties. [See J. Chem. Soc., 4063 (1964); J. Med. Chem., 6, 480 (1963).] We, however, have surprisingly found that certain N-lower alkylazaindoles possess antidepressant rather depressant properties. The parent azaindoles do not possess this biological property.

The novel antidepressant activity of these alkylazaindoles is demonstrated by the standard test employing the prevention of reserpine induced ptosis in animals as disclosed by Costa E. et al., Experientia, 16, 461–463 (1960) and Sulser F. et al., Fed. Proc., 19, 268 (1960). Groups of 10 $CF_1$ male mice weighing 20–30 gms. were used, one group as control. Oral doses of 10, 15 and 25 mg./kg. suspended in tragacanth solution were administered each to a group of mice followed at various time intervals by 1 mg./kg. of reserpine i.v. with observation for prevention of the ptosis effect for 45 minutes after dosage.

In this standard test a representative compound, 7-methylazaindole hydrochloride hydrate, had an $ED_{50}$ of 13.5 mg./kg. [9.6 mg./kg. base (7–13)] with the following specific data:

| Dose | Pretreat Time | Animals | Percent Showing Prevention |
|---|---|---|---|
| 10 | 60 | 10 | 30 |
| 15 | 60 | 10 | 60 |
| 25 | 60 | 10 | ¹80 |
| 25 | 180 | 10 | 30 |
| Controls | | 10 | 0 |

¹ No overt side effects.

In the same test the standard antidepressant drugs amitriptyline and imipramine had $ED_{50}$'s of 15.5 mg./kg. and 10.5 mg./kg. respectively in mice. In a similar test in 200–300 mg. Pratt rats, the compound had an $ED_{50}$ of 11 mg./kg. [base 7.8 mg./kg. (5–13)]. In a dose range study in rats no significant overt effects were observed following an oral dose of 200 mg. of 7-methylazaindole hydrochloride. Moderate depression was present at higher oral doses of 400 and 600 mg./kg. In a standard test which measures prevention of reserpine produced hypothermia in mice, the $ED_{50}$ after oral administration of 7-methylazaindole hydrochloride was 52.1 mg./kg. (36.99 mg./kg. base). In this test, amitriptyline and imipramine had $ED_{50}$'s of 8.75 and 10.8 mg./kg. respectively. The compound had no significant analgetic, ptosis reversal or blood pressure effect at moderate doses.

Therefore the method of this invention for producing antidepressant effects or preventing depression comprises administering internally either parenterally or preferably orally to the host animal, an antidepressant but nontoxic dose of a compound of the structure of Formula I above. The daily dose range of active base compound may be for example from about 10–350 mg., preferably from about 25–350 mg. of base depending on the condition being treated and the potency of the individual compound used.

The pharmaceutical compositions of this invention comprise an active compound as described above in a dosage unit form such as a tablet, capsule, suspension, an injectable sterile solution or suspension, a troche, water, etc. Standard pharmaceutical carriers may be present such as lactose, magnesium stearate, terra alba, sucrose, talc, stearic acid or its glycol esters, gelatin, agar pectin, or acacia, peanut oil, hydrogenated castor oil, olive oil, sesame oil or water. Such dosage units may contain from about 5–250 mg. of active base. From 1–5 dosage units may be administered daily separately or combined in a sustained release form.

The pharmaceutical dosage units are prepared by standard methods such as by mixing with a carrier and filled into a hard gelatin capsule, by granulating and tableting, by suspending a micronized powder in a suitable sterile parenteral vehicle or by suspending in a water base with a thickening agent such as carboxylmethylcellulose for an oral liquid product. The dosage units will contain sufficient active compound to have effective antidepressant activity but still not show limiting toxic side effects.

One skilled in the art will recognize that for calculating the amounts of active ingredients in the claimed dosage unit compositions it is often convenient to use mg./kg. amounts depending on the activity of the chemical ingredient as well as the size and pharmacology of the host animal. In such claimed compositions the active chemical will be present in about 0.25–75 mg./kg. preferably about 0.50–25 mg./kg. amounts of the base.

While the unexpected activity of the N-lower alkylated N-alkyl-4,5,6 and 7 azaindoles of Formula I are the primary purpose of this invention and while the 7-N-methylazaindole and its pharmaceutically acceptable salts are preferred, certain obvious nuclear substituents may be made in these basic structures as known to the art such as lower alkyl of 1–3 carbon atoms, i.e., methyl or ethyl, lower alkoxy of 1-3 carbon atoms, i.e., methoxy or ethoxy, halo, i.e., chloro, fluoro or bromo, trifluoromethyl or nitro, etc., at any of the nuclear C-positions. These nuclear substituted N-alkylazaindoles are prepared and used as are the parent compounds.

Many of the N-lower alkylazaindoles are known to the art such as in J. Am. Chem. Soc., 77, 6554 (1955) or Nature, 179, 41 (1957). The active N-lower alkyl compounds are most conveniently prepared from the known azaindoles by treatment of a reactive lower alkyl ester such as a lower alkyl sulfate, chloride, iodide or bromide usually by heating at reflux in a suitable organic solvent or in a sealed tube at 100° C. with an excess of the ester reagent.

The base is regenerated by treatment of the salt form with an alkali base in ether/water mixture or an organic solvent. Other nontoxic acid addition salts which are an important part of this invention can then be prepared from the base by reaction in organic solvents or aqueous organic solvents with an excess of a pharmaceutically acceptable organic or inorganic acid such as hydrohalic, sulfuric, phosphoric, sulfamic, maleic, ethane sulfonic, succinic, pamoic, acetic, etc. acids. There is some doubt as to the exact structure of the salt forms of these active compounds. For example, the proton may be on the indolo nitrogen atom with a charge on the pyridyl nitrogen atom as compared with the more conventional salt form.

The azaindole starting materials are generally prepared by well-known chemical reactions such as the Madelung type of reaction which uses the alkaline ring closure of acylaminomethylpyridines at high temperature using a sodium N-methylanilide. See for example J. Org. Chem., 30, 2531 (1965);

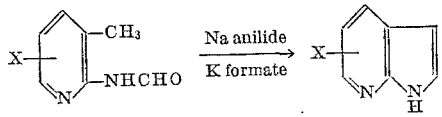

in which X is one or more substituents, such as methyl, ethyl, etc. Other conventional processes may also be used such as cyclization of hydrazones, J. Chem. Soc., 3202 (1959).

The following examples are designed to further illustrate but not to limit the scope of this invention.

EXAMPLE 1

A solution of 10.0 g. (0.85 mole) of 7-azaindole, 8.8 ml. (0.093 mole) of dimethyl sulfate and 50 ml. of chloroform is heated at reflux for one hour, then concentrated to dryness. The resulting product is washed with ether to give the monohydrate, methylsulfate salt, M.P. 115–116° C. This material is neutralized with ether-sodium carbonate solution to give the free base as a low melting yellow solid. The hydrochloride salt is prepared by treatment of the base in ether with an excess of dry hydrogen chloride gas, M.P. 195° C.

Hard gelatin capsule products are prepared by mixing the active hydrochloride salt with lactose to make up to 300 mg. plus 2 mg. of magnesium stearate. The mixture is screened, mixed and filled into a hard gelatin capsule.

In this way the following capsules are prepared:

| 7-methylazaindole, mg. | lactose, mg. |
|---|---|
| 50 | 250 |
| 25 | 275 |
| 75 | 225 |

The capsules are administered prophylactically or curatively to a depressed animal host from 1–5 times orally per day.

Tablet dosage unit compositions of this invention are prepared by mixing sucrose (25 mg.), calcium sulfate dihydrate (150 mg.), and the 7-methylazaindole hydrochloride hydrate (25 mg.) thoroughly then followed by granulating the mixture using 10% gelatin solution. The mixture is screened, dried and rescreened then mixed with starch (15 mg.), talc (5 mg.) and stearic acid (3 mg.) prior to compression into a tablet.

EXAMPLE 2

4-azaindole (5 g.) is reacted with methylsulfate as in Example 1, then converted to the 4-methylazaindole base. This compound (50 mg.) is micronized and mixed with peanut oil, then filled into a soft gelatin capsule.

6-methyl-7-methylazaindole hydrobromide is prepared from 6-methyl-7-azaindole as described in Example 1, then filled into a capsule (75 mg.) as described.

5-azaindole is converted into 5-ethylazaindole sulfate by the chemical method of Example 1 but using ethyl iodide in a sealed tube, then the sulfate salt filled into a capsule in 100 mg. amounts.

5-methyl-7-ethylazaindole prepared by the method of J. Gen. Chem. U.S.S.R., 32, 425 (1962) is converted to the maleate salt as described in Example 1, then filled into hard gelatin capsules in 75 mg. amounts.

6-azaindole is converted into 6-methylazaindole hydrochloride as in Example 1. This salt (25 mg.) is dissolved in aqueous dimethylacetamide, sterilized and filled into a sterile ampoule for parenteral or injectable use.

EXAMPLE 3

The following N-alkylation reactions using known azaindoles (see for example Neth. Pat. 6,510,648) are carried out as described above.

3-bromo-7-azaindole plus methyl sulfate gives 3-bromo-7-methyl-7-azaindole salts.

3-nitro-7-azaindole plus ethyliodide gives 3-nitro-7-ethyl-7-azaindole.

4-methyl-7-azaindole plus allyliodide gives 4-methyl-7-allyl-7-azaindole.

5-nitro-7-azaindole plus methylsulfate gives 5-nitro-7-methyl-7-azaindole.

6-methyl-7-azaindole plus methylsulfate gives 6,7-dimethyl-7-azaindole.

5-methyl-7-azaindole plus methylsulfate gives 5,7-dimethyl-7-azaindole.

4,6-dichloro-7-azaindole plus methylsulfate gives 4,6-dichloro-7-methyl-7-azaindole.

7-methyl-6-azaindole plus methylsulfate gives 6,7-dimethyl-6-azaindole.

2-methyl-6-azaindole plus methylsulfate gives 2,6-dimethyl-6-azaindole.

These products are formulated into tablets, capsules, troches, etc., suitable for internal administration and used as described hereabove.

What is claimed is:

1. A pharmaceutical composition in the dosage unit form of a capsule, tablet, troche or a sterile injectable preparation for producing antidepressant activity containing an effective but nontoxic quantity of a basic N-alkylazaindole compound having the formula:

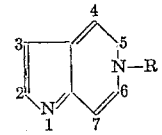

in which X represents a ring aza member at the 7 ring position and in which R is N-lower alkyl of 1–3 carbon or N-allyl; or a nontoxic acid addition salt thereof with a pharmaceutically acceptable acid.

2. The composition of claim 1, in which the basic N-alkylazaindole compound has the formula:

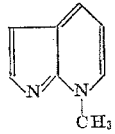

3. The composition of claim 2 in which the hydrochloride salt form is present.

4. The composition of claim 2 in which the 7-methyl-7-azaindole compound is present in from about 5–250 mg. quantity.

5. The composition of claim 2 in which the 7-methyl-7-azaindole compound is present in from 10–100 mg. quantity.

6. The composition of claim 1 in which the dosage unit form contains from about 0.25–75 mg./kg. of the N-alkylazaindole compound, said mg./kg. being the amount of base compound in milligrams calculated in the body weight of the host animal in kilograms.

7. The method of producing antidepressant activity in a warm-blooded vertebrate animal comprising administering internally to said animal a nontoxic but effective quantity of a compound having the base formula in claim 1 or a nontoxic acid additive salt thereof with a pharmaceutically acceptable acid.

8. The method of claim 7 in which the daily dosage of base is from 10–350 mg. administered orally.

9. The method of producing antidepressant activity in a depressed warm-blooded vertebrate animal comprising administering to said animal orally from 1–6 times daily a dosage unit as claimed by claim 2.

10. The method of producing antidepressant activity in a worm-blooded vertebrate animal comprising administering internally to said animal a nontoxic but effective quantity of 7-N-methylazaindole or a nontoxic acid addition salt thereof with a pharmaceutically acceptable acid.

References Cited

UNITED STATES PATENTS 3,320,268    5/1967    Shen _____ 260—295

OTHER REFERENCES

Albert et al. Journal Chem. Society, pp. 4063–4065 (1964).

ALBERT T. MEYERS, *Primary Examiner.*

S. ROSEN, *Examiner.*

S. FRIEDMAN, *Assistant Examiner.*